(12) United States Patent
Von Rundstedt et al.

(10) Patent No.: US 12,520,770 B2
(45) Date of Patent: Jan. 13, 2026

(54) METHOD FOR THE COMPUTER-ASSISTED LEARNING OF AN ARTIFICIAL NEURAL NETWORK FOR DETECTING STRUCTURAL FEATURES OF OBJECTS

(71) Applicant: ROBOTEC PTC GMBH, Bremen (DE)

(72) Inventors: Friederike Von Rundstedt, Bremen (DE); Stephan Von Rundstedt, Bremen (DE); Adrian Leu, Bremen (DE)

(73) Assignee: ROBOTEC PTC GMBH, Bremen (DE)

( * ) Notice: Subject to any disclaimer, the term of this patent is extended or adjusted under 35 U.S.C. 154(b) by 792 days.

(21) Appl. No.: 17/785,523

(22) PCT Filed: Dec. 15, 2020

(86) PCT No.: PCT/EP2020/086251
§ 371 (c)(1),
(2) Date: Jun. 15, 2022

(87) PCT Pub. No.: WO2021/122616
PCT Pub. Date: Jun. 24, 2021

(65) Prior Publication Data
US 2023/0017444 A1    Jan. 19, 2023

(30) Foreign Application Priority Data

Dec. 19, 2019    (DE) ..................... 10 2019 008 881.6
Feb. 11, 2020    (DE) ..................... 10 2020 000 863.1

(51) Int. Cl.
*A01G 2/10*        (2018.01)
*G06V 10/10*       (2022.01)
(Continued)

(52) U.S. Cl.
CPC ............... *A01G 2/10* (2018.02); *G06V 10/16* (2022.01); *G06V 10/40* (2022.01); *G06V 10/764* (2022.01);
(Continued)

(58) Field of Classification Search
CPC .......... A01G 2/10; G06V 10/16; G06V 10/40; G06V 10/764; G06V 10/774;
(Continued)

(56) References Cited

U.S. PATENT DOCUMENTS

2018/0220589 A1    8/2018    Burder

FOREIGN PATENT DOCUMENTS

DE    102016010618 A1    2/2018
DE    112016005059 T5    8/2018
(Continued)

OTHER PUBLICATIONS

Zheng (CrossNet: An End-to-end Reference-based Super Resolutional Network using Cross-scale Warping) (Year: 2018).*
(Continued)

*Primary Examiner* — John B Strege
(74) *Attorney, Agent, or Firm* — Laurence P. Colton; Smith Tempel Blaha LLC

(57) ABSTRACT

A method for the computer-aided training of an artificial neural network (ANN) for recognizing structural features on objects, by means of which method identified structural features on objects are recognizable rapidly and reliable. That is achieved by virtue of the fact that a convolutional neural network (CNN) having a multiplicity of neurons is used for the training of an ANN for feature recognition on objects. Said network comprises a multiplicity of convolutional and/or pooling layers for the extraction of information from images of individual objects. In this case, the images of the objects are respectively scaled or scaled up and/or (Continued)

down from layer to layer. During the scaling of the images information about the structural features of the objects is maintained, specifically independently of the scaling of the images.

12 Claims, 5 Drawing Sheets

(51) Int. Cl.
    *G06V 10/40*     (2022.01)
    *G06V 10/764*     (2022.01)
    *G06V 10/774*     (2022.01)
    *G06V 10/778*     (2022.01)
    *G06V 10/82*     (2022.01)
    *G06V 10/94*     (2022.01)
    *G06V 20/10*     (2022.01)
    *G06V 20/64*     (2022.01)
    *G06V 20/70*     (2022.01)

(52) U.S. Cl.
    CPC ........ *G06V 10/774* (2022.01); *G06V 10/7788* (2022.01); *G06V 10/82* (2022.01); *G06V 20/10* (2022.01); *G06V 20/64* (2022.01); *G06V 20/70* (2022.01); *G06V 10/955* (2022.01)

(58) Field of Classification Search
    CPC .. G06V 10/7788; G06V 10/82; G06V 10/955; G06V 20/10; G06V 20/64; G06V 20/70; G06F 18/2414; G06N 3/0442; G06N 3/045; G06N 3/0464; G06N 3/0895; G06N 3/09; G06N 3/092; G06N 3/098; G06N 3/08
See application file for complete search history.

(56) References Cited

FOREIGN PATENT DOCUMENTS

| | | |
|---|---|---|
| DE | 102018113621 A1 | 12/2019 |
| DE | 102018132069 A1 | 12/2019 |
| EP | 3537342 A1 | 9/2019 |
| WO | 2018024369 A1 | 2/2018 |
| WO | 2019162241 A1 | 8/2019 |

OTHER PUBLICATIONS

Jha et al. ("A comprehensive review on automation in agriculture using artificial intelligence"). (Year: 2019).*
Shi et al. (Plant-part segmentation using deep learning and multi-view vision) (Year: 2019).*
Davis ("Image analysis with artificial neurons to select cutting planes for the micropropagation of syngoniums") (Year: 1994).*
Poier, Georg et al., Learning Pose Specific Representations by Predicting Different Views, 2018 IEEE/CVF Conference on Computer Vision and Pattern Recognition, IEEE, pp. 60-69, (Jun. 18, 2018).
Honghua, Dong et al., Neural Logic Machines, ARVIX.org, Cornell University Library (Apr. 26, 2019).
Huang, Xiang et al., Multi-view Fusion with Deep Learning fro 3D Shape Classification, 2018 International Conference on Audio, Language and Image Processing, IEEE, pp. 189-194 (Jul. 16, 2018).
WIPO, International Search Report (in a related application), (Apr. 9, 2021).
Deutsches Patent-und Markenamt (German Patent and Trademark Office), Recehrchebericht (search in a related application) (Feb. 30, 2021.

* cited by examiner

METHOD FOR THE COMPUTER-ASSISTED LEARNING OF AN ARTIFICIAL NEURAL NETWORK FOR DETECTING STRUCTURAL FEATURES OF OBJECTS

CROSS-REFERENCE TO RELATED APPLICATIONS

This application is the US National Phase of and claims the benefit of and priority on International Application No. PCT/EP2020/086251 having an international filing date of 15 Dec. 2020, which claims priority on and the benefit of German Patent Application No. 10 2019 008 881.6 having a filing date of 19 Dec. 2019 and German Patent Application No. 10 2020 000 863.1 having a filing date of 11 Feb. 2020.

BACKGROUND OF THE INVENTION

Technical Field

The invention relates to a method for the computer-aided training of an artificial neural network for recognizing structural features, in particular on plants or on plant constituents, wherein the network used is a convolutional neural network (CNN), in particular a regional convolutional neural network (R-CNN), having a multiplicity of neurons, said network comprising a multiplicity of convolutional and/or pooling layers for the extraction of information from images of the objects having the structural features to be recognized for a classification of the features by further layers, wherein the images are scaled up and down from layer to layer and wherein during the scaling of the images from layer to layer information about the structural features of the objects is obtained, specifically independently of the scaling of the images. Furthermore, the invention relates to an artificial neural network comprising a multiplicity of neurons, wherein the network is configured in such a way that it is trained by the above method.

Prior Art

In automation technology, in robotics, for autonomous driving, generally for pattern or person recognition, etc., systems based on artificial intelligence (AI) or on artificial neural networks (ANNs) are used for fully or partly automated control. These AI systems or ANNs are based on trained data and, at least during partly autonomous operation for example of a robot, are intended to take account of an environment of the robot in the control. For this purpose, for events or situations that occur in the environment of the robot, suitable reactions are initiated. In relation to the prominent example of autonomous driving, for example, a vehicle is to be controlled such that collisions with obstacles and/or other road users are prevented or that the vehicle follows the course of the roadway. This ANN is trained using training data sets in order gradually to teach the AI system autonomous driving with traffic safety.

On account of the high complexity of the recognition processes in the environment, the use of ANNs is appropriate not just in association with the autonomous driving of vehicles. On the basis of image data recorded by a camera of an (arbitrary) object, for example, the ANN carries out a classification of the objects or structural features that are recognizable in the image data. As a result, the objects can be automatically identified.

Besides autonomous driving or person or speech recognition, the full automation of complex production methods constitutes a further field of application for AI systems. By way of example, it is known that decorative and useful plants can be propagated or reproduced in an almost fully automated manner. Owing to the demand for decorative and useful plants that has constantly been increasing in recent years, the entire process of propagation has been industrialized. This industrialization of plant propagation comprises separating a plant constituent (clone) from a mother plant in an automated manner and feeding the separated plant constituent to a nutrient medium in an automated manner. During this vegetative propagation method or cloning of plants, the use of cost-intensive personnel can be almost completely dispensed with.

Recognizing a suitable cut position on the mother plant and also the process of separating or cutting on the plant have proved to be particularly difficult and thus critical in the full automation of plant propagation. The propagation success or the propagation or growth rate of the separated plant constituent or of a clone depends crucially on the position on the mother plant at which the cut is effected. Every plant has regions which continue to grow with particular preference after a cut or at which roots form with particular preference. Besides the regions or parts of a plant that have varying degrees of suitability for division or cloning, these regions vary from plant to plant or from species to species. Regions e.g. on an orchid that are particularly highly suitable for a separating cut may be less suitable for a corresponding cut on a hemp plant. Therefore, recognizing an optimum cut region is crucial not only for each individual plant, but also for different plant species provided for propagation.

This process of recognizing preferred cut regions in a plant-specific and also plant-species-specific manner poses a major problem for industrialized plant propagation. While trained personnel have no problem in selecting an optimum cut region for each specific plant, this selection of a preferred cut region is impossible using known image recognition devices. Known AI systems or ANNs, for the recognition of structural features on individual objects, such as plants, also fail to yield reliable results suitable for cutting plants in a targeted manner. Particularly during the training of an ANN for image recognition, structural details of objects are masked out in known methods. However, if precisely these details are of importance during the object classification or feature recognition, the known ANNs prove to be unsuitable.

BRIEF SUMMARY OF THE INVENTION

Therefore, the invention addresses the problem of providing a method for the computer-aided training of an artificial neural network for recognizing structural features on objects and also an artificial neural network by means of which identified structural features on objects are recognizable rapidly and reliably.

A solution to this problem is described herein, in which it is provided that for the training of an artificial neural network for feature recognition on objects, a convolutional neural network (CNN), in particular a regional convolutional neural network (R-CNN), having a multiplicity of neurons is used. Said network comprises a multiplicity of convolutional and/or pooling layers for the extraction of information from images of individual objects. This serves for the recognition of the structural features on the objects for a classification of the features by further layers of the network. In this case, the images of the objects are respectively scaled or scaled up and/or down from layer to layer of the ANN. During the scaling of the images from layer to layer, information about the structural features of the objects is maintained, specifically independently of the scaling of the images. The scaling by way of a known bilinear interpolation always leads to a blur effect since intensities of pixels of the images are calculated as a weighted sum of neighboring pixels and details or finer structures are thus lost. The advantage of the method described here over so-called nearest neighbor interpolation (bilinear interpolation) consists, then, precisely in the fact that finer structures are initially present at all in a reduced image, even if their pixel intensity is often considerably reduced.

In order to learn the appearance of a possible cut through the object, in particular through a plant, in particular through a meristem of a plant or through some other plant constituent, the ANN has to know which pixels belong to the possible cut. This is determined by each pixel of a cut being marked as a white pixel during labelling. If these white pixels or this pixel intensity are/is darkened or erased during the required scaling steps in the learning process, the ANN learns exactly this, which has a negative effect on the results.

In order to overcome this problem, according to the invention, instead of the pixel intensities, items of image information or coordinates of the image of the object of the relevant points or features of a possible cut pattern or of a cut curve are stored and scaled to the new image size during the scaling. Afterward, the cut curve is drawn on the newly scaled image, such that each pixel intensity of each curve pixel is white, as it should be. As a result, the ANN can learn all details of the cut curve or the structural features.

Preferably, it is additionally provided that a plurality of, in particular 2, 3, 4, 5, or 6, images from different perspectives of the same object for recognizing the structural features or the cut curve are created and transferred simultaneously with the ANN, wherein computer-aided operations for recognizing the structural features of the object are carried out on the images in parallel on a plurality of GPUs. As a result, in comparison with the processing of the individual images, a very rapid recognition of the features becomes possible. A plurality of cameras are available for recording the object from different perspectives. These, in particular 2, 3, 4, 5, or 6, cameras are arranged around the object, preferably the plant, or the object is taken to the cameras. The cameras are triggered in a predefined order in terms of hardware in order to ensure an optimum image quality with regard to the image exposure and the absence of overexposure resulting from the lights in front of a camera. The cameras are situated at the corners of a polygon, in particular of a hexagon, and image the object in steps of e.g. 60 degrees. If further steps or a different step size are/is required, a robot arm can rotate the object by 30 degrees or the suitable degrees and restart the imaging process. After that, for example, 12 images in steps of 30 degrees may be available. This process can be repeated until the desired step is reached (18 images in steps of 20 degrees, 36 images in steps of 10 degrees, etc.).

The AI system or the ANN has to evaluate all images recorded from an object in order to ascertain the best angle (in the case of plants that angle or orientation between the object and the cutting means that is best suited to the cutting). It may also be the case that more than one suitable angle exists. If the images are transferred individually to the ANN, the duration of the process is very long since the ANN has to be reinitialized after each mage. If, instead, six or more images are joined together and presented simultaneously, the processing time decreases almost by the factor of the presented images (six times faster for six images, etc.). This is only possible, of course, as long as the scaled or reduced and joined together images still contain enough information that the ANN can achieve a good performance. In particular, the invention furthermore provides for the plurality of images of the same object to be scaled, in particular rescaled, and stitched prior to transfer to the neural network.

Furthermore, it can be provided according to the invention that labeling, or designation, marking, tagging, of the features of the objects is carried out semiautomatically on the images in preparation for the training process of the ANN, wherein preferably firstly the features and/or the objects are isolated from a background of the images and in particular afterward labelling of the features is carried out by a person. This minimizes the necessary personal interaction and therefore results in faster and more accurate labelling or tagging. This step is crucial for enabling the AI system to learn how new objects are to be processed.

The image marking usually requires the person carrying out the labeling or tagging to accurately mark the objects of interest in order to separate them from other objects and from the background. This process is very time-consuming and requires a high degree of attentiveness. In order to improve or accelerate this process, the objects are separated from one another and from the background by the ANN by way of a color segmentation. During the cutting of the plant, the labelling person merely has to position the cuts. Afterward, all other contours of the object or of the plant are automatically recognized or extracted. The same method is also used for assisting the tagging or labelling person when labelling plants on a conveyor belt. The plant contour is automatically extracted and the tagger only has to mark the point at which the robot is intended to capture the plant and the orientation of the plant. The entire training process of the ANN can be considerably accelerated as a result.

Furthermore, it can be provided that labelling of the features of the objects in a computer-aided manner is proposed and/or that the images used are presorted prior to the labeling, wherein only images whose objects and/or features of the objects differ from objects and/or features of the objects of other images are used for the labeling.

A further exemplary embodiment can provide that after the labeling the images are grouped into groups of images having objects which have few structural features, many structural features and/or complex structural features. In order to achieve this, the ANN is trained such that it measures the similarity between images and can thus determine how likely it is that two different images were recorded from the same object and/or from the same perspective. This measure of similarity can be used in order to determine whether both images ought to be labelled if they add new information to the ANN, or whether one of them is sufficient since the use of the second image would not bring any significant new information.

The ANN is also trained to determine the complexity of an object or of an object class by ascertaining similarities between different objects of the same class or type/species or generic kind/genus. Simpler objects, i.e. objects having few structural details, have a higher similarity between different instances. By contrast, more complex objects have a lower similarity. This similarity measurement can be taken as a basis for estimating how many different images of objects of a specific class have to be labelled and used for training the ANN.

Preferably, it is furthermore provided that for the training of the ANN the images having the objects whose features are to be recognized are fed only to a few layers, in particular to the upper layers, and only the weightings of these layers are adapted, wherein the remaining, fixed, layers are not adapted for the training process of the network, in particular their weightings remain unchanged for all of the images. In order to accelerate the training process, the output of these fixed layers can be precalculated and buffer-stored. During training, these buffer-stored values are then used for each image, instead of their being repeatedly recalculated. Reading a buffer-stored value is at least 10 to 100 times faster than recalculating the values, which results in a considerable acceleration of the training process.

The individual method steps which are carried out in an ANN can be regarded as a series of mathematical operations which are subsequently applied to the input data. Each layer represents a different operation applied to the input data of this layer. Let us assume that the input data are called i. The exemplary ANN has five layers designated as l1, l2, l3, l4 and l5. The processing proceeds as follows: l1 applies its operation or transformation to i and generates the output o1=l1 (i). In the same way, o2=l2 (o1) arises when the second layer is applied to the output of layer 1. The same applies to l3, l4 and l5. If l1, l2 and l3 are not trained, o3 is always the same for i, regardless of how often it is calculated. If l4 and l5 are trained, their output changes during the training process, such that o4 and o5 are different after each iteration of the training process. Instead of calculating o1, o2 and o3 each time for the input i, however, it is possible for o3 to be stored and used each time when i is used as input. Therefore, for each input ik and output o3 k is stored and transferred to l4. In this way, the processing time for the first three layers is reduced since loading the output of the layer 3 is considerably faster than calculating the output to the first three layers. The acceleration is all the greater, the more layers a network has and the fewer the data present at the output of the last fixed layer.

One particularly preferred exemplary embodiment of the invention can provide that for the training process only the weightings of the upper layers are adapted and the rest of the layers are not adapted for the training process, wherein in particular the weightings of the upper layers are adapted for each image and for the rest of the layers the weightings are not adapted for all of the images.

In particular, it is additionally conceivable that the individual method steps are carried out simultaneously in parallel on a plurality of computer units, wherein the necessary operations are distributed among all the computer units in such a way that an optimum utilization of the computer capacity is attained. Moreover, the software architecture is developed in the form of a pipeline: all units can run in parallel and are connected to one another by the use of buffers that transfer the outputs to the next station in the pipeline. In contrast to sequential processing, in which the cycle time is given by the sum of all the computer units, the cycle time for pipeline processing is independent of the number of computer units and is given by the slowest computer unit including reading/writing to/from the buffer. The processing pipeline for the hardware and the software of the apparatus used is designed similarly to that of a traditional conveyor belt. In the application example of the propagation of plants, in particular a meristem of a plant or some other plant constituent, a plurality of stations are assigned to this conveyor belt or the apparatus. A first station removes a plant from a tub. In a second station, images of the plant are created from all sides. In the third station, the plant is cut. In the fourth station, the plant on the conveyor belt is checked. That involves establishing whether further cuts are necessary. In the fifth station, the plant on the conveyor belt is recognized and grasped in order to put the cut-off part of the plant into a new tub. A sixth station determines optimum space utilization by the plants in the output tubs.

Such a "pipeline" can work efficiently only if all its components can work independently of one another and in parallel. In order to achieve this, both the process and the calculation are parallelized. The process is parallelized by way of two robot arms operating the first three stations. A third arm is used for the last two stations. All the image processing modules are also operated in parallel by the computational load being distributed among a plurality of computers.

Furthermore, it is conceivable that the labeling is carried out on a 3-dimensional image or object, wherein the 3-dimensional image or object is projected on two dimensions and is fed to the neural network for training purposes and is subsequently converted back into a 3-dimensional image or object. Provision is made for incorporating the further dimension in the neural network by using recurrent neural networks that treat series of images as part of a sequence. In this way, individual views give rise to information that can be passed on to the other perspectives in order to obtain a complete evaluation of a 3D image of the object or the plant. In this case, the labelling is effected on a 3D model of the object. Later this labelling/model is projected back onto 2D images. The latter are then assessed by the ANN and combined again to form a 3D model.

Hitherto, images recorded by the cameras have been processed and assessed individually by the ANN, independently of whether or not they originate from the same object. This additional information can be very useful, however, particularly if the same part of the object was captured from more than one perspective.

In this context, it can furthermore be provided that a recurrent neural network is used for the processing of the third dimension of the image or object, said network processing series of images of an object as a part of an image sequence, whereby information of an object from one perspective is transferred to other perspectives of the same object. In order to obtain meaningful labellings for all images of the same object, the 3D reconstruction of the object and the labelling of the 3D model are suitable.

A further exemplary embodiment of the invention can provide that the outputs of the neurons are fed again to the ANN for self-training purposes, wherein output errors are recognized by the network and/or a person and are marked as such. A mixture of supervised and unsupervised learning can thus take place according to the invention. With the aid of supervised learning, the machine can decide where cutting ought to be effected. Moreover, cut plants on the conveyor belt can also be assessed. On the basis of this second evaluation of the plant or the cut, a cutting unit can align or configure itself in a timely manner in order to reduce the errors ascertained by the AI system. This approach can be generalized for all steps in which a manufactured part is assessed a number of times. The individual image processing stations are firstly trained by means of supervised learning and new labelling data are automatically generated online. New labels or tags are automatically generated by reassessment of the output of one specific image processing station with the aid of another image processing station that can view the object at a later point in time.

In the case of plants, the ANN determines the positions at which the plants, in particular the position at which a meristem of the plant or the position at which some other plant constituent, ought to be cut. The images of the plants cut according to the stipulations are then stored and used for automatically retraining the ANN (self-supervised learning). Another possibility for unsupervised learning consists in directly quantifying the cut quality of the plants and feeding back this information online in order then to directly update the ANN (reinforcement learning). In particular, it is furthermore conceivable that the person makes available to the network the information regarding how said network recognizes how the feature of the object is to be treated, in particular cut and/or grasped.

Preferably, it is provided that the recognized structural features of the objects are used in order to calibrate a laser for a treatment of the object and/or in order to control a laser in such a way that the latter cuts the object in a targeted manner. One of the core elements of the method according to the invention is laser camera calibration, which makes possible so-called "What you see is what you cut". This laser camera calibration makes it possible that a cut which was previously determined in a plant image by the ANN can be converted into laser coordinates, such that the laser cuts exactly what the ANN has proposed.

In contrast to lasers used for scanning a surface, the laser in the method is used for cutting plants. Therefore, conventional methods used for the laser camera calibration of scanning lasers cannot be used here. A conventional method would use a calibration object captured both by the camera and by the laser, and would calculate the transformation between the laser coordinate system and the camera coordinate system on the basis of the different views on the same object. Since the laser in the method described here is not used for scanning, this approach cannot be used, and so a novel approach has to be invented. Following the intrinsic and extrinsic camera calibration of the camera used, in particular the stereo camera used, the camera can reconstruct every 3D point in its view. In order to properly coordinate the laser with the camera, a sheet of paper is positioned approximately in the principal focal plane of the laser. Subsequently, the laser is controlled in such a way that it marks a grid of known size on the paper. In the next step, a new sheet of paper is positioned a few centimeters closer to the laser and the marking is carried out again with the same coordinates as in the previous step. The two sheets are then recorded by the stereo camera directly after the laser labeling. All intersection points of the grid are then automatically extracted. Their 3D coordinates can be calculated on account of the previous camera calibration. If the grid consists of m rows and n columns a view contains a total of m×n points that are recognized by the cameras, with the result that a total of 2×m×n points from the two laser markings are available. These points are used for estimating the position of the origin transformation of the laser with 6 degrees of freedom in relation to the camera coordinate system. After this transformation has been estimated, every 3D point of camera coordinates can be converted into laser coordinates. Therefore, each of the 3D cut lines determined by the ANN can be converted into laser coordinates, such that the laser can cut precisely along the lines proposed by the ANN.

A neural network for solving the stated problem is described herein, in which it is provided that a neural network comprises a multiplicity of neurons, wherein the network is configured in such a way that it is trained by the method described herein.

BRIEF DESCRIPTION OF THE DRAWINGS

Preferred exemplary embodiments in association with the invention are described in greater detail below with reference to the drawing, in which.

DETAILED DESCRIPTION OF PREFERRED EMBODIMENTS

Figure 1:
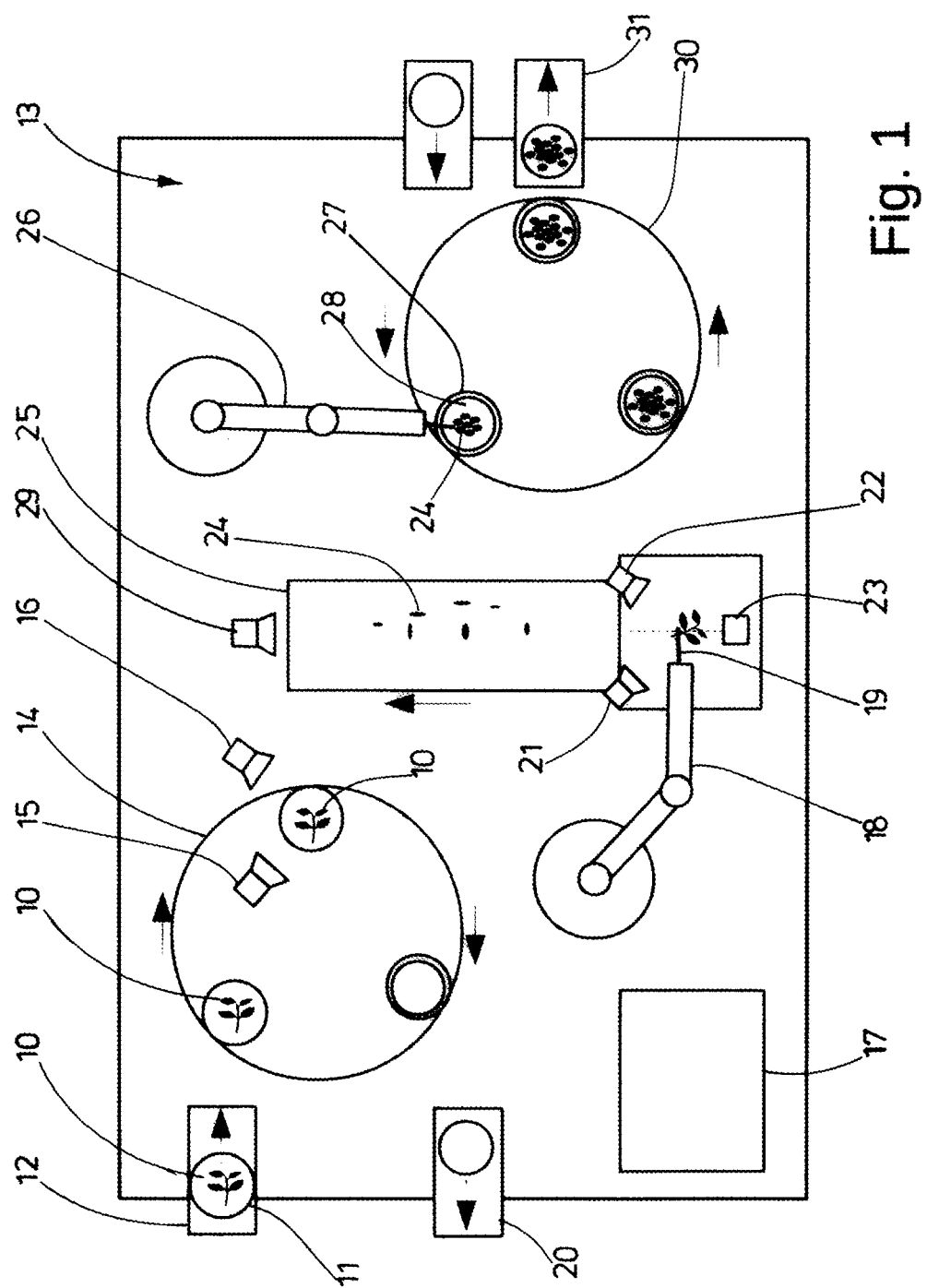
FIG. 1 shows an illustration of a first exemplary embodiment of an apparatus.

One exemplary embodiment of an apparatus is illustrated highly schematically in FIG. 1. The method according to the invention and also the ANN according to the invention find application in association with this exemplary apparatus. It should be emphasized, however, that the method according to the invention and also the ANN according to the invention are not restricted to use in association with this apparatus, but rather are also usable in association with other formulated problems.

The method and the apparatus essentially serve for the automated propagation of plants. The propagation rate or growth rate for plants is improved by the apparatus illustrated here and also by the method according to the invention. In the exemplary embodiment illustrated in FIG. 1, a plant 10 or a constituent of a plant 10 initially in a, preferably sterile, container 11 on a conveying means 12 is fed to a work region 13. This work region 13 can likewise be kept sterile, if appropriate. From the conveying means 12, which can be designed as an airlock, for example, the container 11 together with the plant 10 is fed to a first conveyor 14. In addition to the exemplary embodiment illustrated as a rotating disk in FIG. 1, said first conveyor 14 can also be a conveyor belt or a tray. On said first conveyor 14, the plant 10 is captured by an image recognition device having two cameras 15, 16. On the basis of the information about the plant 10 thus obtained, positions at which the plant 10 can particularly preferably be grasped by the first gripping means 18 are ascertained by the control unit. The first gripping means 18, which is designed here as a robot arm, has tweezers 19, using which the plant 10 is removed from the container 11. If the plant 10 is firmly rooted in the container 11, the plant 10 can be pulled out of the container 11 or can be separated from the roots using, for example, an arbitrary cut by a cutting means. The container 11, which is then empty, is removed from the work region 13 again via a further conveying means 20.

The plant 10 hanging from the tweezers 19 is then fed to a further image recognition device having two further cameras 21, 22. These cameras 21, 22 take photographs of the hanging plant 10 from various perspectives. The information about the plant 10 thus obtained is used by the control unit 17 to recognize plant-specific features of the plant. These plant-specific features can be for example the species of the plant and also properties of leaves, stems or branches. It is additionally conceivable that the control unit 17 recognizes the species of the plant. Equally, however, it is also conceivable that an operator has previously input the species of the plant to be propagated into the control unit 17 via an input means. In the control unit 17, an ideal cut position or an ideal cut pattern is then ascertained by the ANN according to the invention on the basis of the recognized plant-specific features. In this case, for this determination the ANN uses not only the information of the present plant 10 but also information about previous plants and data that were previously made available to the neural network by an operator.

With the aid of the ANN and the method according to the invention, it is possible not only to determine the ideal cut line but also to determine the type and/or the physical properties of a cutting means for an optimum cut. In the exemplary embodiment illustrated in FIG. 1, the cutting means is a laser 23. This laser 23 can be modulated depending on the recognized plant-specific features in such a way that a cut image that is particularly preferred for the root development of the clone is generated. It has been found that the root development and thus the growth of the clone can be stimulated by the selection of the laser properties. For an ideal cut image or cut pattern, the intensity of the laser, the wavelength and also the focus or the focal length are changed in such a way that the plant is cut without contact and thus without crushing. As a result of this targeted deposition of the energy, the tissue of the plant is virtually unimpaired; rather, further growth is even stimulated.

The separated constituent 24 or the clone then falls onto a second conveyor 25. It can be provided that a second gripping means 26 grasps the clone 24 from this second conveyor 25 and feeds it to a container 27 having a nutrient medium 28. A camera 29, which is likewise connected to the control unit 17 for ascertaining an optimum gripping position, is likewise used for preferred picking up of the clone 24 by the second gripping means 26. The containers 27 thus filled are then transferred out of the work region 13 via a third conveyor 30 and a conveying means 31. Directions of movement of the individual components are symbolized by the arrows illustrated in FIG. 1.

Consequently, by way of the image recognition illustrated in FIG. 1, plant-specific features of the plant 10 are recognized and the ANN ascertains cut lines, along which the plant is then cut by a suitable cutting means. It should be pointed out here that the invention is not restricted to the illustrated number of gripping means 18, 26, the number of conveyors 14, 25, 30 and the number of cameras 15, 21, 22, 29. Rather, it can be provided that a multiplicity of cameras are assigned to the apparatus for image recognition. It is equally conceivable for the apparatus to comprise only one conveying means for conveying away a clone.

Figure 2:
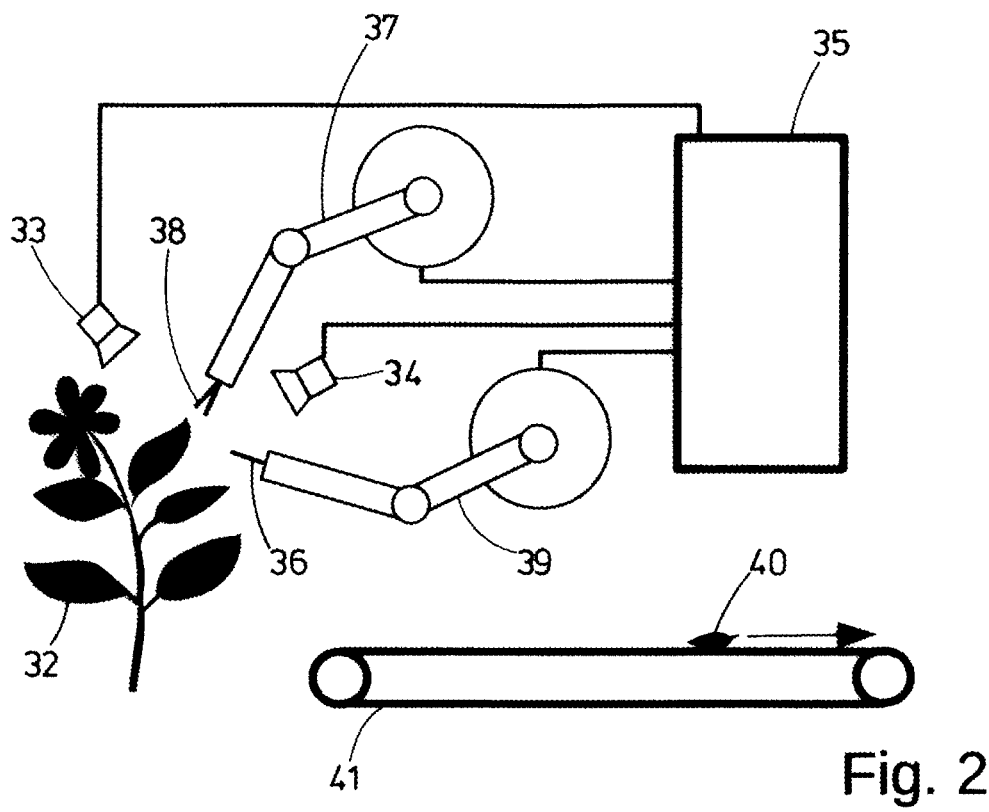
FIG. 2 shows an illustration of a second exemplary embodiment of the apparatus.

FIG. 2 illustrates a further exemplary embodiment of an apparatus, this exemplary embodiment being usable in association with the method according to the invention and the ANN according to the invention. Here a position which is particularly highly suitable for cutting off a clone is ascertained by the cameras 33, 34 of the image recognition device and the ANN directly at the plant 32. Here, too, the cameras 33, 34 are connected to a control unit 35. With the aid of the ANN, the control unit 35 ascertains not only an optimum cut position or an optimum cut line, but also optimum cut conditions. In this regard, the neural network determines how the laser 36 used here is to be modulated or controlled in order to create an ideal cut image. The adaptation of the focal length to the position to be cut likewise takes place in addition to the modulation. As soon as a corresponding position for cutting the plant 32 has been ascertained by the control unit 35, the plant constituent is grasped by the gripping means 37 by means of tweezers 38 and the second robot arm holding the laser 36 is moved in such a way that the plant is cut in accordance with the cut image ascertained. The separated constituent 40 or the clone of the plant 32 can then be placed on a conveyor 41 by the gripping means 37. The conveyor 41 then transports the separated constituent 40 to a further station for processing. Here the separated constituent 40 can be treated further for example in accordance with the method illustrated in FIG. 1.

Figure 3:
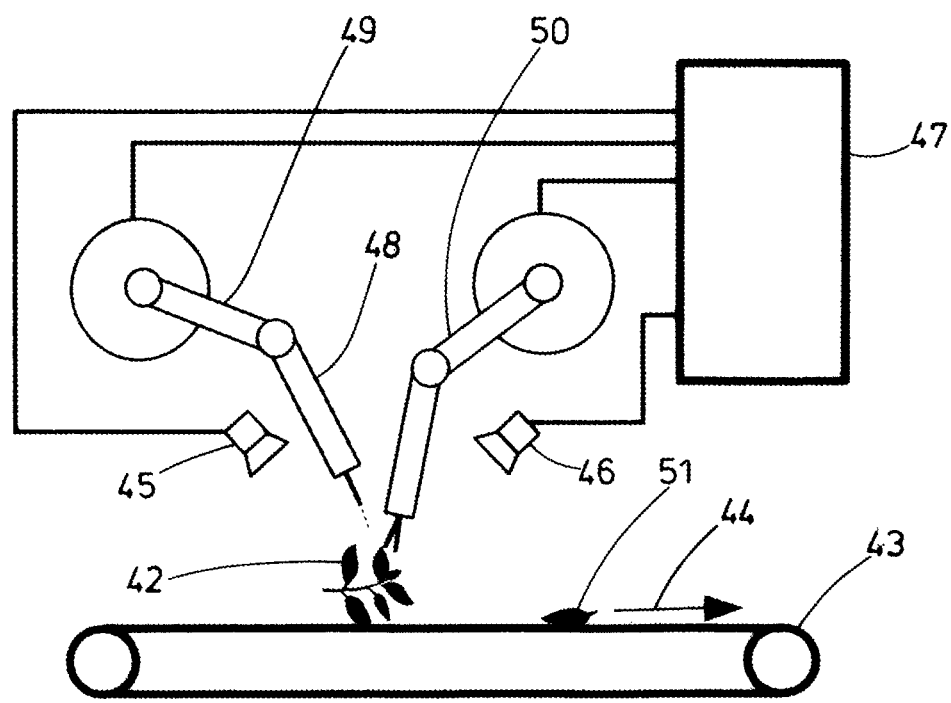
FIG. 3 shows an illustration of a further exemplary embodiment of the apparatus.

FIG. 3 illustrates a further exemplary embodiment of the invention. In this exemplary embodiment, a plant 42 or a constituent of a plant 42 lies on a conveyor 43 and is fed in the arrow direction 44 to an image processing device consisting of two cameras 45 and 46. Notwithstanding the exemplary embodiment illustrated here, the image recognition device can also comprise further cameras. Precisely as described above in the example illustrated in FIG. 2, here as well an optimum cut image and also preferred physical properties of the cutting means or the laser are ascertained by the cameras 45, 46 and by a control unit 47 and the ANN. As soon as this information has been generated by the control unit 47, a corresponding cut is executed by the laser 48. It is also conceivable for the plant 42 to be cut repeatedly by the laser 48. Here, too, the laser 48 is assigned to a robot arm 49 for optimum mobility. In the exemplary embodiment illustrated in FIG. 3, the gripping means 50 is merely used for the purpose of either placing the plant 42 on the conveyor 43, removing residual constituents of the plant 42 from the conveyor 43, or feeding the separated constituent 51 to a further processing station. However, it is also conceivable for the gripping means 50 to be completely dispensed with in the exemplary embodiment of the invention illustrated in FIG. 3.

Figure 8A:
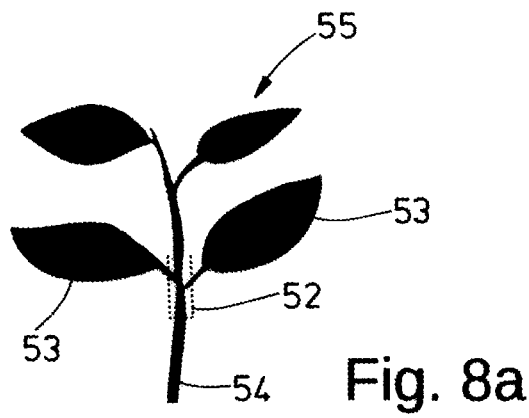
FIG. 8a shows an illustration of a first cut line.

Depending on the type of plant and also the requirements in respect of division, it can be advantageous to use various cut images for the cutting. FIG. 8a illustrates a U-shaped cut that separates both two leaves 53 and a part of the stem 54 from the plant 55. Three constituents of the plant 55 are thus separated by a single cut by means of a laser, a water jet or a plasma beam. Three individual cuts would be necessary for this purpose in the case of manual, conventional cutting. This U-cut 52 can be effected both in a position of the plant 55 hanging from a gripping means and in a position lying on a conveyor. It is additionally conceivable for such a cut also to be carried out by a stamping means composed of metal or a ceramic. In this case, in particular, a punch can be kept free of germs by application of heat or electric current. However, a particularly preferred non-contact and non-crushing cut can only be realized by the use of a laser beam or a water jet or a plasma beam.

Figure 8B:
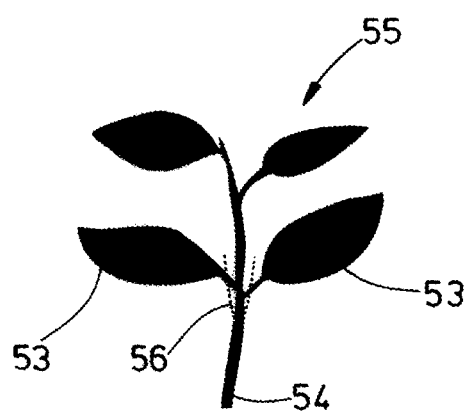
FIG. 8b shows an illustration of a second cut line.

Besides the U-cut 52 illustrated in FIG. 8a, it is additionally conceivable to execute a V-cut 56 using the laser (FIG. 8b). Two leaves 53 and also a part of the stem 54 are cut off here as well. However, the cut in the stem 54 differs from the straight cut from FIG. 8a. This V-cut 56 can be advantageous at least for some plant species particularly for the root development of the cut edge.

Furthermore, it can be provided that the V-cut 56 from FIG. 8b is placed slightly adjacent to the stem 54, whereby, firstly, two leaves 53 are still separated from the plant 55 by means of one cut and, moreover, a cut area on the stem 54 is maximized. The separated constituent of the plant 55 can absorb a particularly large amount of nutrients through this particularly large cut area, which results in a particularly preferred growth rate or root development.

Figure 8C:
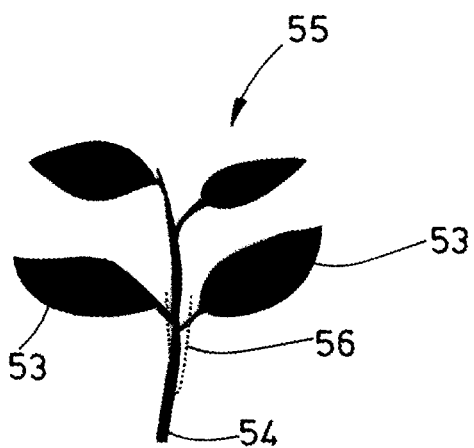
FIG. 8c shows an illustration of a third cut line.

Besides the examples of cut images illustrated in FIGS. 8a to 8c, a multiplicity of further cut images are conceivable which are used, in an efficient manner, to cut a plurality of constituents of a plant simultaneously and to stimulate the root development of the separated plant. The type and the position of the cuts are likewise ascertained by the ANN.

Figure 4:
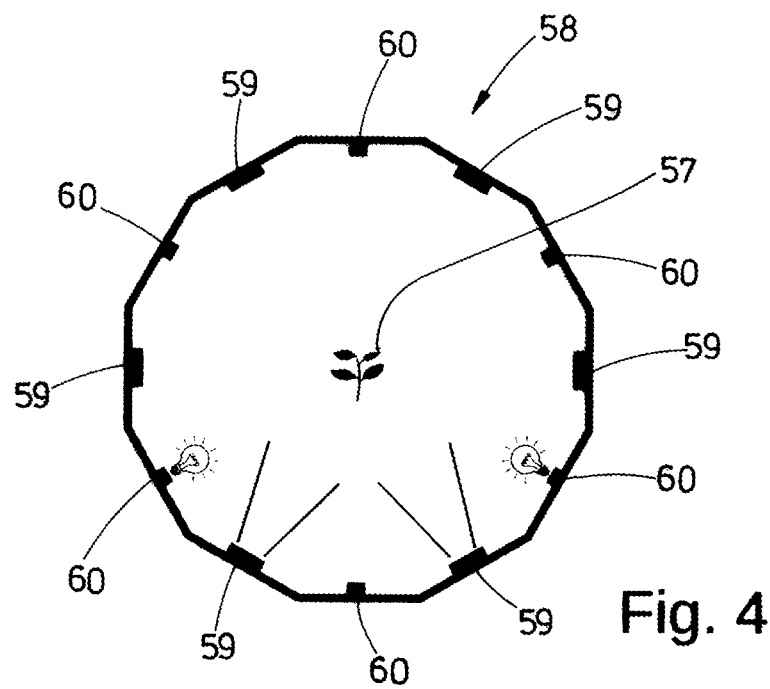
FIG. 4 shows an illustration of a first step of image recognition.
Figure 5:
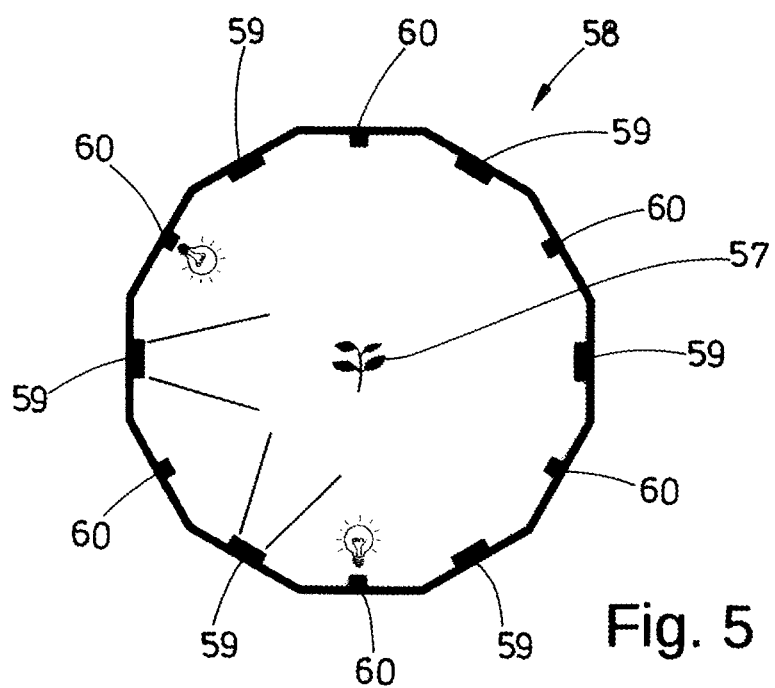
FIG. 5 shows an illustration of a second step of the image recognition.
Figure 6:
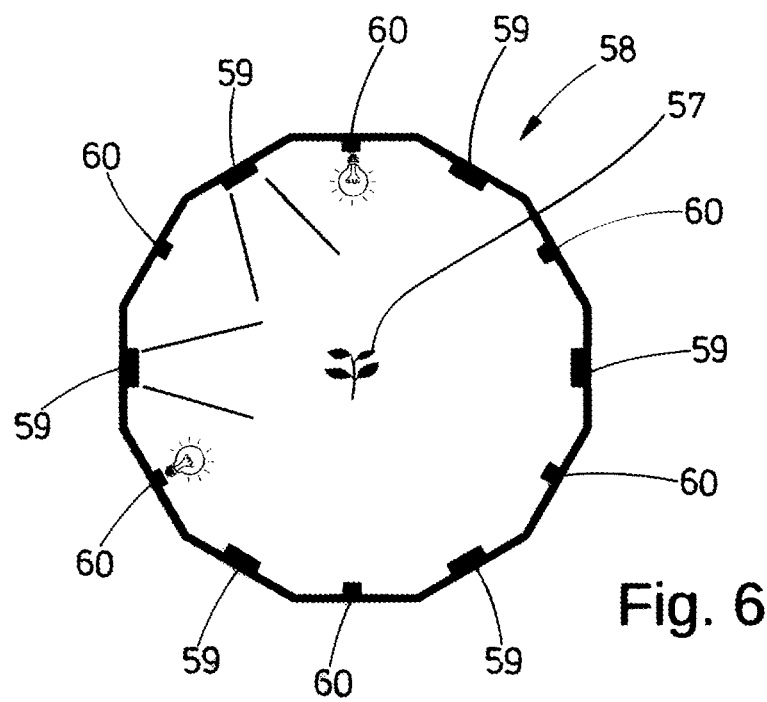
FIG. 6 shows an illustration of a third step of the image recognition.

One exemplary embodiment of the image recognition of a plant 57 is illustrated highly schematically in FIGS. 4 to 6. For capturing a spatial image representation of the plant 57, the latter is suspended by a gripping means (not illustrated) in a ring-like image recognition device 58. In this case, the plant 57 is preferably positioned centrally in the image recognition device 58. The ring can have a diameter of a few decimeters, i.e. 20 cm to 30 cm and 30 cm to 40 cm or 40 cm to 50 cm, and a wall height of 5 cm to 10 cm to 10 cm to 20 cm or 20 cm to 30 cm. However, it is also conceivable for the image recognition device 58 illustrated here to be dimensioned differently. In the exemplary embodiment of the image recognition device 58 illustrated in FIGS. 4 to 6, the ring has straight sections. These 12 sections are each alternately assigned a camera 59 and an illuminant 60. That is to say that six cameras 59 and six illuminants 60 are assigned to the illustrated exemplary embodiment of the image recognition device 58.

In a first step of the image recognition, two, preferably adjacent, cameras 59 are activated. At the same time, illuminants 60 situated near the cameras 59 are triggered and sufficiently illuminate the plant 57 (FIG. 4). The illuminants 60 are to be switched in such a way that they do not subject the activated cameras 59 to glare. The remaining cameras 59 and respectively illuminants 60 are not activated. In a second step illustrated in FIG. 5, a following pair of cameras 59 is activated and the two adjacent illuminants 60 are likewise switched on. In the succeeding step of the image recognition in accordance with FIG. 6, a next pair of cameras 59 and the corresponding illuminants 60 are activated. This method is continued until the plant 57 has been captured from all directions over a solid angle of 360° by the camera pairs, i.e. twelve recordings in the example mentioned. If the cameras 59 are designated by K1, K2, K3, K4, K5, K6 and the illuminants 60 by L1, L2, L3, L4, L5, L6, then the following three steps arise: step 1: L1, K1, L2, K2, L3; step 2: L3, K3, L4, K4, L5, step 3: L5, K5, L6, K6, L1. In this case, the progressive actuation of the cameras 59 and the illuminants 60 is effected by a control device assigned to the image recognition device 58. It is also conceivable, of course, for fewer or more cameras 59 to be used, which then progressively image different angular sections of the plant 57 optionally in pairs.

The images thus captured are evaluated by the above-discussed control unit or by the ANN. This evaluation includes the recognition of plant-specific features along which the plant can preferably be divided by a cutting means. This image capture or this sequence of the individual recordings last a few 100 milliseconds.

Furthermore, it can be provided that the plant 57 is cut by a cutting means directly in the ring-like image recognition device 58, also called a theatre. The separated constituent of the plant 57 can either be grasped by a further gripping means or be conveyed away on a conveyor positioned below the image recognition device 58.

The cameras that are activated in FIGS. 4 to 6 are highlighted by a schematically illustrated recording cone. A respective incandescent bulb is assigned to each of the illuminants 60 that are activated in FIGS. 4 to 6.

Figure 7:
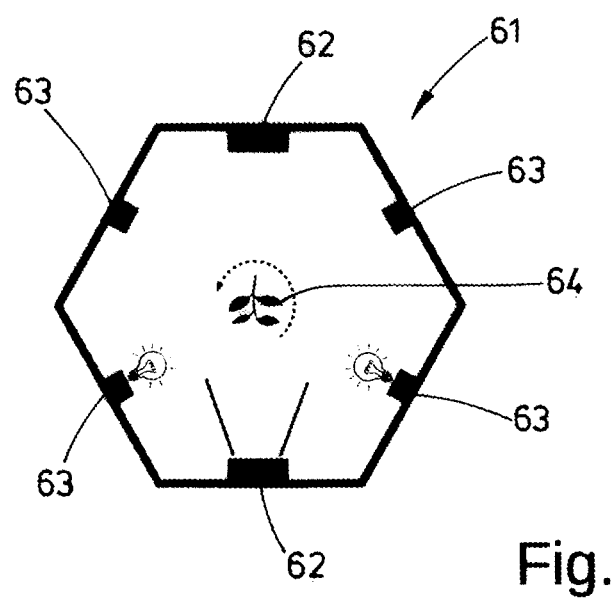
FIG. 7 shows an illustration of a further exemplary embodiment of the image recognition.

A further exemplary embodiment of an image recognition device 61 is illustrated in FIG. 7. This exemplary embodiment is also of ring-like design, similarly to the exemplary embodiment of an image recognition device 58 illustrated in FIGS. 4 to 6. Here, however, the ring has only six straight lateral surfaces. Accordingly, only two opposing cameras 62 and four illuminants 63 are assigned to the inner walls of the image recognition device 61. Precisely as described above, in each case one camera 62 is activated together with two adjacent illuminants 63 in order to create an image representation of the plant 64. The correspondingly opposing camera 62 and the opposing illuminants 63 are then activated in order to create a second recording of the plant 64. In order to compensate for the smaller number of cameras, the plant 64 is rotated by a specific angular range after each recording, such that a plurality of recordings from various positions of the plant 64 are effected in succession. From the totality of all image representations thus obtained, plant-specific features of the plant 64 can be recognized once again by the control unit or the ANN.

In addition to the exemplary embodiments of the image recognition devices 58, 61 illustrated here, further geometries having more or fewer cameras are conceivable. These image recognition devices 58, 61 can be assigned to the exemplary embodiments of the invention in accordance with FIGS. 1 to 3. A particularly efficient method for propagating plants can be produced by this combination of the image recognition and the specified cutting method.

LIST OF REFERENCE SIGNS

10 Plant
11 Container
12 Conveying means
13 Work region
14 First conveyor
15 Camera
16 Camera
17 Control unit
18 First gripping means
19 Tweezers
20 Conveying means
21 Camera
22 Camera
23 Laser
24 Constituent
25 Second conveyor
26 Second gripping means
27 Container
28 Nutrient medium
29 Camera
30 Third conveyor
31 Conveying means
32 Plant
33 Camera
34 Camera
35 Control unit
36 Laser
37 Gripping means
38 Tweezers
39 Robot arm
40 Constituent
41 Conveyor
42 Plant
43 Conveyor
44 Arrow direction
45 Camera
46 Camera
47 Control unit
48 Laser
49 Robot arm 50 Gripping means
51 Constituent
52 U-cut
53 Leaf
54 Stem
55 Plant
56 V-cut
57 Plant
58 Image recognition device
59 Camera
60 Illuminant
61 Image recognition device
62 Camera
63 Illuminant
64 Plant

The invention claimed is:

1. A method for computer-aided training of an artificial neural network for recognizing structural features on plants or on plant constituents for cloning the plants, whereby the structural features represent cutting positions on the plants, wherein the network used is a convolutional neural network (CNN) having a multiplicity of neurons, said network comprising a multiplicity of convolutional and/or pooling layers for extraction of information from images of the plants or the plant constituents having structural features to be recognized for a classification of the features by further layers, comprising:

scaling the images up and down from layer to layer;
during the scaling of the images from layer to layer obtaining information about the structural features of the plants or the plant constituents, specifically independently of the scaling of the images; and
labeling or designation of the structural features of the plants or the plant constituents semiautomatically on the images in preparation for a training process of the neural network, wherein the features and/or the plants or the plant constituents are isolated from a background of the images and labelling of the features is carried out by a person,
wherein a plurality of images from different perspectives of a same one of the plants or the plant constituents for recognizing the structural features are transferred simultaneously to the neural network,
wherein computer-aided operations for recognizing the structural features of the plants or the plant constituents are carried out on the images in parallel on a plurality of GPUs,
wherein the plurality of images of a same one of the plants or the plant constituents are scaled or rescaled and stitched prior to transfer to the neural network,
wherein the labeling of the structural features of the plants or the plant constituents in a computer-aided manner is proposed.

2. The method for the computer-aided training of an artificial neural network for recognizing structural features on plants or on plant constituents as claimed in claim 1, wherein the images used are presorted prior to the labeling, wherein only images whose plants or plant constituents and/or features of the plants or the plant constituents differ from plants or plant constituents and/or features of the plants or the plant constituents of other images are used for the labeling.

3. The method for the computer-aided training of an artificial neural network for recognizing structural features on plants or on plant constituents as claimed in claim 1, wherein after the labeling the images are grouped into groups of images having plants or plant constituents which have few structural features, many structural features and/or complex structural features.

4. The method for the computer-aided training of an artificial neural network for recognizing structural features on plants or on plant constituents as claimed in claim 1, wherein for the training of the network the images having the plants or the plant constituents whose features are to be recognized are fed only to a few layers, in particular to the upper layers, and only the weightings of these layers are adapted, wherein the rest of the layers are not adapted for the training process of the network, in particular their weightings remain unchanged for all of the images.

5. The method for the computer-aided training of an artificial neural network for recognizing structural features on plants or on plant constituents as claimed in claim 1, wherein for the training of the network only the weightings of the upper layers are adapted and the rest of the layers are not adapted for the training process, wherein in particular the weightings of the upper layers are adapted for each image and for the rest of the layers the weightings are not adapted for all of the images.

6. The method for the computer-aided training of an artificial neural network for recognizing structural features on plants or on plant constituents as claimed in claim 1, wherein the method is carried out simultaneously in parallel on a plurality of computer units, wherein the necessary operations are distributed among all the computer units in such a way that an optimum utilization of the computer capacity is attained.

7. The method for the computer-aided training of an artificial neural network for recognizing structural features on plants or on plant constituents as claimed in claim 1, wherein the labeling is carried out on a 3-dimensional image of the plants or the plant constituents, wherein the 3-dimensional image of the plants or plant constituents is projected on two dimensions and is fed to the neural network for training purposes and is subsequently converted back into a 3-dimensional image of a same one of the plants or on plant constituents.

8. The method for the computer-aided training of an artificial neural network for recognizing structural features on plants or on plant constituents as claimed in claim 7, wherein a recurrent neural network is used for the processing of a third dimension of the image of the plants or on plant constituents, wherein said network further processes a series of images of the plants or on plant constituents as a part of an image sequence, whereby information of the plants or the plant constituents from one perspective is transferred to other perspectives of the same one of the plants or on plant constituents.

9. The method for the computer-aided training of an artificial neural network for recognizing structural features on plants or on plant constituents as claimed in claim 1, wherein outputs of the neurons are fed again to the neural network for self-training purposes, wherein output errors are recognized by the network and/or a person and are marked as recognized by the network and/or a person.

10. The method for the computer-aided training of an artificial neural network for recognizing structural features on plants or on plant constituents as claimed in claim 9, wherein the person makes available to the network the information regarding how said network recognizes how the feature of the plants or the plant constituents is to be treated, in particular cut and/or grasped.

11. The method for the computer-aided training of an artificial neural network for recognizing structural features on plants or on plant constituents as claimed in claim 1, wherein the recognized structural features of the plants or the plant constituents are used in order to calibrate a laser for a treatment of the plants or the plant constituents and/or in order to control a laser in such a way that the laser cuts the plants or the plant constituents in a targeted manner.

12. The method for the computer-aided training of an artificial neural network for recognizing structural features on plants or on plant constituents as claimed in claim 1, wherein the network used is a regional convolutional neural network (R-CNN).

\* \* \* \* \*